Dec. 15, 1931.                W. R. BROWN                1,836,642
                          OPHTHALMIC MOUNTING
                           Filed Oct. 9, 1930
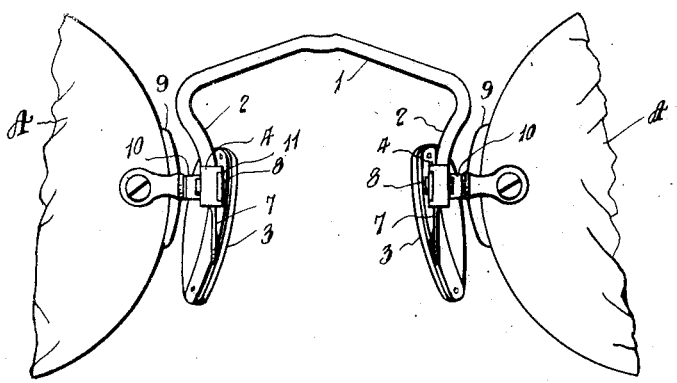
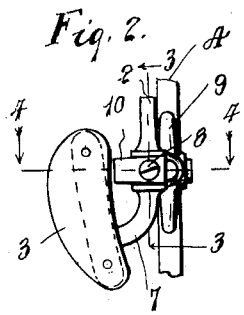  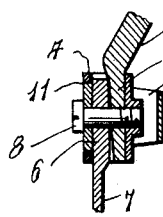  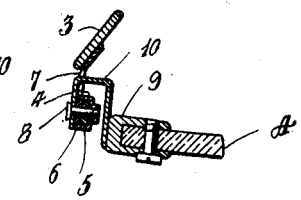
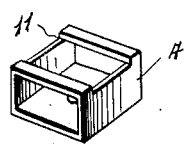  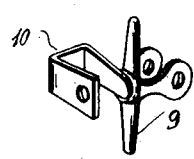
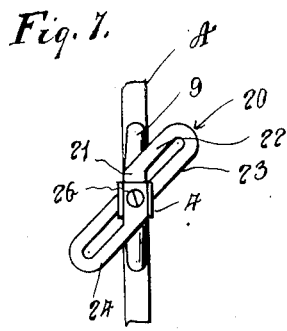  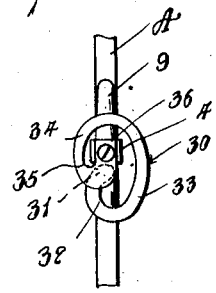
Inventor
W. R. Brown,
By L. F. Randolph Jr.
Attorney Patented Dec. 15, 1931

1,836,642

UNITED STATES PATENT OFFICE

WILLIAM R. BROWN, OF MONROE, LOUISIANA, ASSIGNOR TO SHURON OPTICAL COMPANY, INC., OF GENEVA, NEW YORK

OPHTHALMIC MOUNTING

Application filed October 9, 1930. Serial No. 487,620.

The invention relates to the construction of spectacles, and has for its principal object the provision of a mounting for the lenses of spectacles by which the lenses have flexibility relatively to the bridge member mounted on or engaging the nose of the wearer.

In the construction of spectacles it is desirable that lenses at all times shall be in proper alinement. This is necessary in order that the corrective features of the lenses shall be in proper position relatively to the wearer's eyes to overcome the defects for which the lenses are provided. Heretofore in the construction of spectacles it has been the practice to make the lens supports rigid with the bridge piece. During the use of the spectacles the frame members are liable to get out of alinement making it essential that the spectacles be readjusted frequently in order to insure proper alinement of the lenses with the wearer's eyes. To overcome this defect in spectacles as at present made, the members connecting the rigid bridge and the lens supports are made resilient, to permit relative movement of the lens supports on the bridge member, and this is an object of the invention.

Another object of the invention is the provision of what might be termed "a shock absorber" between the rigid bridge and the lenses to eliminate danger of breakage of the lenses at the lens clamps in removing the glasses from, or putting them on the wearer's face, or during handling, this being an incident of the use of the resilient connection between the bridge and lenses. Furthermore this resilient connection prevents bending of the bridge in handling the glasses which would result in throwing it out of adjustment and altering the relative distance between the pads, which have been previously fitted to properly accommodate themselves to the wearer's nose.

The invention will be described in detail hereinafter, and will be found illustrated in the accompanying drawings, in which:

Figure 1 is a fragmentary view of spectacles showing the improvements applied thereto, Figure 2 is a fragmentary side view of the inner portion of a nose rest showing the resilient connecting member between the bridge and the lens support, Figure 3 is a vertical sectional view on a plane indicated by the line 3—3 of Figure 2, Figure 4 is a transverse horizontal view on a plane indicated by the line 4—4 of Figure 2, Figure 5 is a perspective view on an enlarged scale of one of the clamping members for holding the bridge, nose pad or rest, and resilient supporting member for the lens holder, Figure 6 is a view in perspective of a preferred form of connecting member between the bridge and lens, Figure 7 is a view of a modified form, and Figure 8 is a view of a still further modified form.

In the drawings similar reference characters are used to designate corresponding parts in all of the views.

For the purpose of illustrating the improvements and means for connecting the bridge member and lens supports of spectacles a conventional type of bridge and nose rest is shown in which is a rigid bridge member having downwardly extending arms 2, and joined to nose pads 3 by means of a tubular clamping member 4 receiving the lower ends of the arms 2, that are reduced and flattened as shown at 5 to fit within the clamping member 4, and joined to a flat portion 6 of arms 7 supporting the nose pads 3, and held together in the usual manner by means of a nut and bolt 8. The parts hereinbefore described are conventional parts used in the nose pad type of ophthalmic mountings, and in lieu thereof it will be apparent that any other type of rigid bridge structure may be substituted therefor, such for instance as what is known in the art as a "saddle bridge".

The lenses A may be supported by means of clamp or strap members 9 as shown in the drawings, or in lieu of the clamp or strap members 9 the lenses may be secured in the conventional frames, but instead of being secured directly to the bridge member a connecting member is provided consisting of a strap 10 of suitable resilient material, such as rolled gold, said strap 10 being preferably formed in U-shape as best shown in Figures 4 and 6, having one of its ends soldered, or otherwise secured to the lens support 9 while its other end is secured to the nose side of clamping member 4 and at right angles to the ends 5 and 6 of the arms 2 and 7, respectively, said clamping member 4 being provided with a cut-out grooved portion 11 in which the free end of the strap 10 is seated, and is secured to the clamping member 4 by the bolt and nut 8 heretofore referred to, or by any other suitable means.

As the resilient member 10 is arranged so that it is at right angles to the arms 2 and 7, as hereinbefore described, the resilience in the clamp relatively to the bridge member and the nose pads, as shown in the drawings, is in a plane substantially at right angles to the bridge member, this permitting flexibility of the lenses relatively to the bridge member which will prevent distortion of the bridge adjustment during handling and the resultant altering of the alinement of the lenses relatively to the eyes of the wearer. It will be furthermore understood that because of this construction adjustment of the bridge member 1 and the nose pads 3 may be made to suit the convenience of the wearer and this adjustment will be permanent and all danger of the alinement of the lenses being destroyed by the bridge member and nose pads becoming distorted during handling is avoided, and that furthermore in whatever adjustment the bridge members and the pads are placed the lenses will always be in proper position or alinement relatively to the eyes of the wearer. It will be furthermore understood that the flexibility of the straps 10 may vary to suit different conditions in different mountings.

In Figure 7 is shown a mounting including the anchor members or straps 9 in which the flexible member designated 20 is connected as shown at 21 to the strap 9 and has an upwardly extending arm 22, then returned and a downwardly extending arm 23 which is again returned and an upwardly extending arm 24 provided and the end 26 is provided to be secured as heretofore described in connection with the member 10 to the clamping member 4.

In Figure 8 is shown a further modification in which the flexible member is designated 30 and is connected as shown at 31 with the anchor or strap 9 and extended downwardly as shown at 32 and then curved laterally and upwardly as shown at 33 in a continuous spiral ending with a downwardly curved portion 34 turned upwardly as shown at 35 and provided with an end 36 to be secured to the clamping member 4.

It will be understood that the expressions "nose rest" and "nose-engaging member" as used in the claims is deemed to include the part or parts that support the spectacle from the nose of the wearer and may include either or both the bridge and the pads, which parts are adapted for permanent adjustment with respect to each other.

What is claimed:—

1. In an ophthalmic mounting, a rigid bridge member, nose pads, nose pad arms, a tubular clamping member receiving and connecting said bridge member with each of said nose pads, arms lens supports, resilient straps on said lens supports and having their free ends engaging said clamping members, said clamping members being grooved to provide seats for said straps, and means to secure said bridge member, nose pads and resilient straps together and to said clamping members.

2. In a spectacle, a substantially rigid bridge, a nose pad substantially rigidly secured thereto for permanent adjustment with respect to the bridge, a lens-supporting member, a lens carried by said supporting member, and a resilient element connected to the bridge and to the lens-supporting member and having a portion bent in a direction to permit hinging movement of the lens-supporting member in a plane at substantially right angles to the normal plane of the lens independent of the bridge and its pad.

3. A spectacle comprising a rigid bridge, a nose pad supporting member rigidly secured thereto for permanent adjustment with respect to the bridge, a pad carried by said supporting member, a lens-carrying member, and a resilient element connected to the bridge and to the lens-carrying member, and permitting swinging movement of the lens-carrying member independently of the bridge and pad support.

4. A spectacle comprising a rigid bridge, a nose pad, a nose pad supporting member rigidly secured to the bridge for permanent adjustment with respect thereto to fit the nose of the wearer without spring tension, a lens-carrying member and a resilient element connected to the bridge and to the lens-carrying member and permitting movement of the lens-carrying member independently of the bridge and pad support and without affecting the permanent adjustment of said bridge and pad support.

5. A spectacle comprising a rigid bridge, a nose pad, a nose pad support rigidly secured to the bridge for permanent adjustment with respect thereto to fit the nose of the wearer without spring tension, a lens-carrying member and a single connection between the bridge and the lens-carrying member and consituting the sole support for the latter from the former and comprising a resilient element having one end connected to the bridge and the other end connected to the lens-carrying member to permit movement of the lens-carrying member independently of the bridge and pad-support.

6. A spectacle comprising a rigid bridge, a nose pad, a nose pad support rigidly secured to the bridge for permanent adjustment with respect thereto to fit the nose of the wearer without spring tension, a lens-carrying member and a single connection between the bridge and the lens-carrying member and constituting the sole support for the latter from the former and comprising a resilient element disposed at the rear of the lens-carrying member and the bridge and having one end connected to the bridge and the other end connected to the lens-carrying member to permit movement of the lens-carrying member independently of the bridge and pad-support.

7. A spectacle comprising a rigid bridge, nose pads, bendable substantially non-resilient nose pad-supporting means rigidly secured to the bridge for permanent adjustment with respect thereto, a lens-clamp, a lens secured to the clamp and an elastic strap provided with a bent portion intermediate its ends and having one end rigidly secured to the bridge and its opposite end rigidly secured to the lens-clamp and constituting the sole support from the bridge for said lens-clamp and lens carried thereby and permitting swinging movement of the lens into substantially vertical planes angularly disposed with respect to the normal vertical plane of the lenses.

8. A spectacle comprising a rigid bridge, nose pads, bendable substantially non-resilient nose pad-supporting means rigidly secured to the bridge for permanent adjustment with respect thereto, a lens-clamp, a lens secured to the clamp, and an elastic strap provided with a bent portion intermediate its ends disposed at the rear of the lens and bridge and having one end rigidly secured to the bridge and its opposite end rigidly secured to the lens-clamp and constituting the sole support from the bridge for said lens-clamp and lens carried thereby and permitting swinging movement of the lens into substantially vertical planes angularly disposed with respect to the normal vertical plane of the lenses.

9. A spectacle comprising a rigid bridge, nose pads, pliable substantially non-resilient nose-pad supporting members rigidly secured to the bridge for permanent adjustment with respect thereto to fit the nose of the wearer without spring tension, lenses on opposite sides of the bridge, and resilient members having one of their ends secured to the bridge and their opposite ends secured to respective lenses and constituting the sole support for the lenses from the bridge and permitting swinging movement of the lenses with respect to the bridge independently of the bridge and pad-supports.

10. A spectacle comprising a rigid bridge, nose pads, pliable substantially non-resilient nose-pad supporting members rigidly secured to the bridge for permanent adjustment with respect thereto to fit the nose of the wearer without spring tension, lenses on opposite sides of the bridge, and resilient members having portions extending rearwardly from the lenses and connected to the bridge and having intermediate bent portions disposed at the rear of the lenses and bridge, said resilient members constituting the sole supports for the lenses from the bridge, permitting swinging movement of the lens with respect to the bridge and pad-supports and without affecting the permanent relative adjustment of said bridge and pad-supports.

11. In an ophthalmic mounting, a nose bridge, nose pad supports thereon, lens clamps adapted to receive lenses, and resilient members connecting said bridge and lens clamps and having portions extending rearwardly from the lens clamps and connected to the bridge, said members having intermediate bent portions disposed at the rear of the bridge and lens clamps and constituting the sole connections between said bridge and lens clamps.

12. In an ophthalmic mounting, a nose bridge, nose pad supports thereon, lens clamps adapted to receive lenses, and resilient straps connecting said bridge and lens clamps, said straps being bent intermediate of their ends and having one of their ends secured to the bridge, and the other end of each strap secured to a lens clamp, said straps extending rearwardly of the bridge and lens clamps and constituting the sole connections between the bridge and lens clamps.

In testimony whereof I affix my signature.

WILLIAM R. BROWN.

CERTIFICATE OF CORRECTION.

Patent No. 1,836,642.             Granted December 15, 1931, to

WILLIAM R. BROWN.

It is hereby certified that error appears in the printed specification of the above numbered patent requiring correction as follows: Page 2, line 75, claim 1, strike out the comma, first occurrence and insert same after "arms" in same line and claim; and that the said Letters Patent should be read with this corrections therein that the same may conform to the record of the case in the Patent Office.

Signed and sealed this 23rd day of February, A. D. 1932.

(Seal)                                                       M. J. Moore,
                                                             Acting Commissioner of Patents.